US006227974B1

(12) United States Patent
Eilat et al.

(10) Patent No.: US 6,227,974 B1
(45) Date of Patent: May 8, 2001

(54) INTERACTIVE GAME SYSTEM

(75) Inventors: Amir Eilat, Tel Aviv; Arnold Zucker, Hashmonaim, both of (IL)

(73) Assignee: NDS Limited, Middlesex (GB)

( * ) Notice: Subject to any disclaimer, the term of this patent is extended or adjusted under 35 U.S.C. 154(b) by 0 days.

(21) Appl. No.: 09/242,781

(22) PCT Filed: Jun. 11, 1998

(86) PCT No.: PCT/IL98/00267

§ 371 Date: May 6, 1999

§ 102(e) Date: May 6, 1999

(87) PCT Pub. No.: WO99/00163

PCT Pub. Date: Jan. 7, 1999

(30) Foreign Application Priority Data

Jun. 27, 1997 (IL) ........................................ 121178

(51) Int. Cl.[7] ....................................... A63F 9/22

(52) U.S. Cl. ................... 463/40; 463/36; 463/1; 463/3; 273/148 B; 345/419

(58) Field of Search .................... 463/30–31, 36, 463/40–42; 395/200.3, 186; 455/3.1, 4.1, 5.1, 6.3; 364/410.1; 345/330, 8, 419; 434/55; 273/148 B; 382/118; 600/595

(56) References Cited

U.S. PATENT DOCUMENTS

| Re. 34,340 | 8/1993 | Freeman | 358/86 |
|---|---|---|---|
| 4,355,805 | 10/1982 | Baer et al. | 273/85 |
| 4,372,558 | 2/1983 | Shimamoto et al. | 273/238 |

(List continued on next page.)

FOREIGN PATENT DOCUMENTS

| WO 98/08192 | 2/1998 | (WO) | G06T/1/00 |

OTHER PUBLICATIONS

M. Carignan Et Al., "Dressing Animated Synthetic Actors With Complex Deformable Clothes,"+01 Computer Graphics Conference Proceedings, vol. 26, No. 2, Jul. 1992, pp. 99–104.

M. Miller, "Being Virtual," PC Magazine, Feb. 6, 1996, pp. 29.

L. Yun Et Al., "On Architectures for Video Compositing," Multimedia Systems 1994, Springer–Verlag Publishers, pp. 181–190.

(List continued on next page.)

*Primary Examiner*—Jessica J. Harrison
*Assistant Examiner*—Sheila Clayton
(74) *Attorney, Agent, or Firm*—Ladas & Parry

(57) ABSTRACT

A gaming method for use with an interactive game which is played at a player unit having an interface device which is coupled to a television and to at least one communication network. The method includes displaying, via the interface device, the interactive game on the television, capturing a picture of a player, transferring the picture of the player to a headend, processing the picture of the player to create an avatar of the player, electronically assimilating the avatar into the interactive game, and enabling the player to interactively play the interactive game by controlling the avatar via the at least one communication network. In another preferred embodiment, a gaming method is provided for use with an interactive game in which, at a first player unit, a first interface device is coupled to a first television and to a communication network, and at a second player unit, a second interface device is coupled to a second television and to the communication network. The method includes displaying, via the first and second interface devices, the interactive game at the first and second televisions, and enabling a first player, playing at the first player unit, and a second player, playing at the second player unit, to play along with the interactive game by competing each against the other via the communication network.

16 Claims, 9 Drawing Sheets

U.S. PATENT DOCUMENTS

| | | | |
|---|---|---|---|
| 4,521,014 | | 6/1985 | Sitrick .................................... 273/1 |
| 4,572,509 | * | 2/1986 | Sitrick .................................... 463/31 |
| 4,695,953 | | 9/1987 | Blair et al. ........................... 364/410 |
| 4,710,873 | | 12/1987 | Breslow et al. ..................... 364/410 |
| 4,918,516 | | 4/1990 | Freeman ................................ 358/86 |
| 5,035,422 | | 7/1991 | Berman ................................ 273/439 |
| 5,083,800 | | 1/1992 | Lockton ............................... 273/439 |
| 5,108,115 | | 4/1992 | Berman et al. ...................... 273/439 |
| 5,190,285 | | 3/1993 | Levy et al. ......................... 273/85 G |
| 5,271,626 | | 12/1993 | Llenas et al. ........................ 273/430 |
| 5,373,857 | * | 12/1994 | Travers et al. ....................... 600/595 |
| 5,382,026 | | 1/1995 | Harvard et al. ...................... 273/310 |
| 5,423,555 | | 6/1995 | Kidrin .................................. 273/434 |
| 5,462,275 | | 10/1995 | Lowe et al. ............................ 273/94 |
| 5,490,784 | * | 2/1996 | Carmein ................................ 434/55 |
| 5,530,469 | | 6/1996 | Garfinkle ................................ 348/1 |
| 5,545,088 | | 8/1996 | Kravitz et al. ........................ 463/40 |
| 5,548,340 | | 8/1996 | Bertram ............................... 348/559 |
| 5,553,864 | | 9/1996 | Sitrick .................................... 463/31 |
| 5,558,339 | * | 9/1996 | Perlman ................................ 463/42 |
| 5,586,257 | | 12/1996 | Perlman ................................ 463/42 |
| 5,586,937 | | 12/1996 | Menashe ............................... 463/41 |
| 5,600,368 | | 2/1997 | Matthews, III ...................... 348/143 |
| 5,601,487 | | 2/1997 | Oshima et al. .......................... 463/4 |
| 5,609,525 | | 3/1997 | Ohno et al. ............................ 463/43 |
| 5,630,757 | | 5/1997 | Gagin et al. .......................... 463/43 |
| 5,635,978 | | 6/1997 | Alten et al. .............................. 348/7 |
| 5,640,192 | | 6/1997 | Garfinkle ................................ 348/1 |
| 5,643,088 | | 7/1997 | Vaughn et al. ........................ 463/40 |
| 5,667,459 | | 9/1997 | Su ......................................... 482/4 |
| 5,674,127 | | 10/1997 | Horstmann et al. ................... 463/42 |
| 5,688,174 | | 11/1997 | Kennedy ............................... 463/37 |
| 5,695,401 | | 12/1997 | Lowe et al. .............................. 463/4 |
| 5,760,821 | | 6/1998 | Ellis et al. ............................. 348/10 |
| 5,877,732 | * | 3/1999 | Ziarati .................................... 345/8 |
| 5,892,900 | * | 4/1999 | Ginter et al. ......................... 395/186 |
| 5,900,849 | * | 5/1999 | Gallery ............................ 273/148 B |
| 5,913,727 | * | 6/1999 | Ahdoot .................................. 463/40 |
| 5,950,202 | * | 9/1999 | Durward et al. ..................... 345/330 |
| 5,956,038 | * | 9/1999 | Rekimoto ............................ 345/419 |
| 5,960,099 | * | 9/1999 | Hayes, Jr. et al. .................. 382/118 |

OTHER PUBLICATIONS

D. Amdur, "Virtually Speaking," Multimedia Online, Multimedia World, Mar. 1996, PP. 114.

Multimedia News Update, "The Shape of Things to Come: Alpha World Brings A 3–D Virtual World to the Internet," Multimedia World, Sep. 1995, Edited by Michael Desmond, pp. 16–17.

A. Goldberg, "Improv: A System for Real–Time Animation of Behavior–Based Interactive Synthetic Actors," From "Creating Personalities for Synthetic Actors," 1997, Springer–Verlag Publishers, pp. 58–73.

Q. Wang Et Al., "Em—An Environment Manager for Building Networked Virtual Environments," Virtual Reality Annual Int'l Symposium, Mar. 11–15, 1995, pp. 11–18.

C. Hughes Et Al., "Shared Virtual Worlds for Education: The Explorenet Experiment," Multimedia Systems, vol. 5, Mar. 1997, Springer–Verlag Publishers, pp. 145–154.

J. Hodgins Et Al., "Animating Human Athletics," Computer Graphics Proceedings, Annual Conference Series, Aug. 6–11, 1995, pp. 71–78.

S. Benford Et Al., "Embodiments, Avatars, Clones and Agents for Multi–User, Multi–Sensory Virtual Worlds," Multimedia Systems, vol. 5, Mar. 1997, Springer–Verlag Publishers, pp. 93–104.

C. Greenhalgh Et Al., "Massive: A Collaborative Virtual Environment for Teleconferencing," ACM Transactions on Computer–Human Interaction, vol. 2, No. 3, Sep. 1995, pp. 239–261.

D. Shawver, "Virtual Actors and Avatars in a Flexible User–Determined–Scenario Environment," IEEE 1997 Virtual Reality Annual Int'l Symposium, Mar. 1–5, 1997, pp. 170–177.

N. Badler, "Real–Time Virtual Humans," Proceedings of the Fifth Pacific Conference on Computer Graphics and Applications, Oct. 13–16, 1997, pp. 4–13.

D. Boyer Et Al., "The Personal Presence System: A Wide–Area Network Resource for the Real–Time Composition of Multipoint Multimedia Communications," Multimedia Systems 1996, Springer–Verlag Publishers, pp. 122–130.

N.M. Thalmann Et Al., "Animating Virtual Actors in Real Environments," Multimedia Systems, vol. 5, Mar. 1997, Springer–Verlag Publishers, pp. 113–125.

P. Maes Et Al., "The Alive System: Wireless, Full–Body Interaction With Autonomous Agents," Multimedia Systems, vol. 5, Mar. 1997, Springer–verlag Publishers, pp. 105–112.

T. Noma Et Al., "Automating Virtual Camera Control for Computer Animation," From "Creating and Animating," Springer–Verlag Publishers, Tokyo, 1992, pp. 177–186.

D. Coco, "3D Stars on TV," Computer Graphics World, Apr. 1998, pp. 40, 41, 44, 46, 48, 50, 51.

L. Fahlen Et Al., "A Space Based Model for User Interaction in Shared Synthetic Environments," INTERCHI '93, Conference on Human Factors in Computing Systems, Apr. 24–29, 1993, pp. 43–48.

"Sharing Virtual Worlds," IEEE Spectrum, Mar. 1997, Edited by R. Braham and R. Comerford, pp. 18–51.

K. C. Lee Et Al., "Virtual Stage: A Scenario–Based Karaoke System in Virtual Environment," The Fifth Pacific Conference on Computer Graphics and Applications, Oct. 13–16, 1997, pp. 159–167.

S. Wilcox, "Avatars 97," Web Techniques, Jan. 1998, pp. 69–74.

* cited by examiner

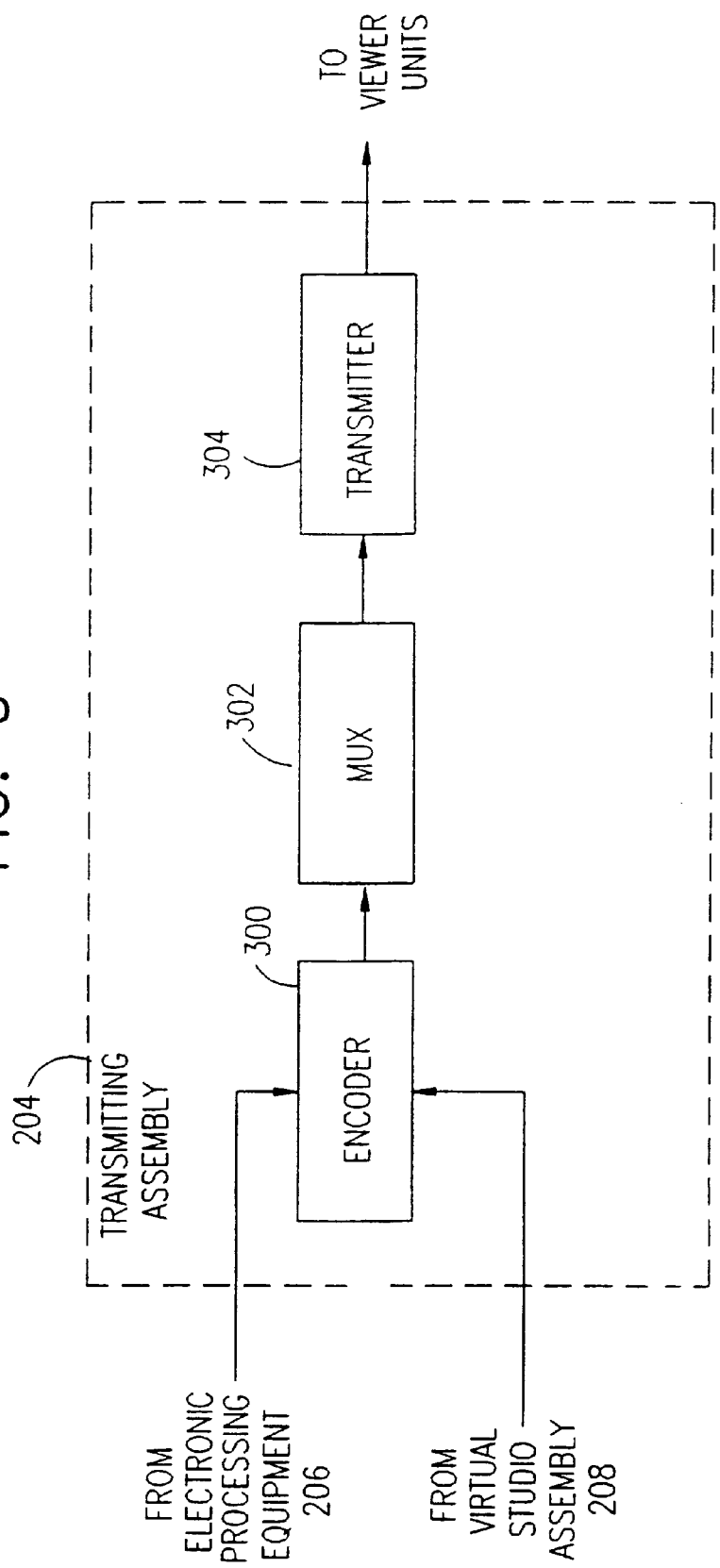

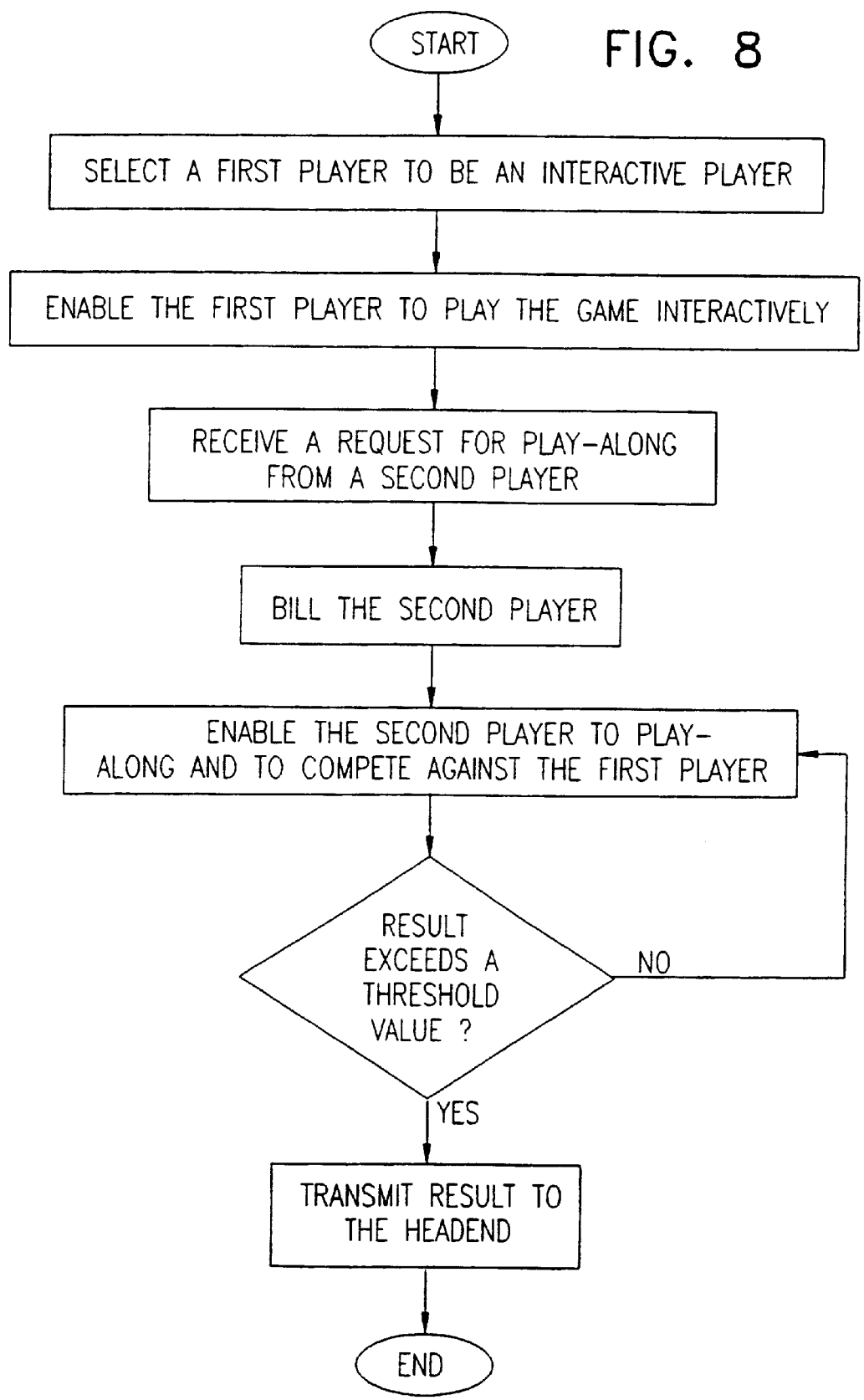

INTERACTIVE GAME SYSTEM

The present invention relates to interactive audio-visual productions generally and more particularly to interactive games and other diversions which are played via a communication network and with assistance of a television.

BACKGROUND OF THE INVENTION

There are known in the art several interactive games. One popular game show is based upon an animated character named "Hugo". The game show is broadcast to a plurality of viewers that view the game on television, and one of the viewers is selected to be a player.

The player controls "Hugo" via telephone by pressing keys "2", "4", "6" and "8" of a touch-tone telephone, so that "Hugo" is moved up when the key "2" is pressed, moved to the left when the key "4" is pressed, moved to the right when the key "6" is pressed, and moved down when the key "8" is pressed.

Generally, the player manipulates "Hugo" through a series of obstacles, and his success in manipulating "Hugo" is measured in comparison with other players that are selected during the show. A winner is declared as a player who was most successful in manipulating "Hugo".

Other games are also described in various U.S. Patents.

U.S. Pat. No. 5,545,088 to Kravitz et al. describes a television game show which is interactively played by the studio participant game players, the television studio audience and by telephone with the television-viewing home audience.

U.S. Pat. No. 4,695,953 and the corresponding re-issue patent RE 33,662 describe TV animation interactively controlled by the viewer wherein the motion picture branching method is superseded by an animation method which enables rapid and repeated switching of multiple tracks of different camera-originated animation of the same character during continuous action in a scene, and enables branching at the termination of an action to multiple actions or scenes.

U.S. Pat. No. 4,355,805 to Baer et al. describes apparatus and methods for use in conjunction with raster scan video displays, including standard monochrome and color television receivers, for the generation, display and manipulation of images upon the screen of a display for the purpose of playing games or for the purpose of drawing pictures.

U.S. Pat. No. 5,600,368 to Matthews, III describes an interactive television system that has a set-top box adapted for use with a television and a remote control handset. The set-top box is connected to receive a television broadcast that is filmed using multiple cameras situated at various camera viewpoints.

U.S. Pat. No. 5,035,422 to Berman and U.S. Pat. No. 5,108,115 to Berman et al. describe an interactive game show and method for achieving interactive communication therewith in which, by providing an interactive communication system whereby individuals are able to electronically select at least one possible outcome of a plurality of outcomes of a future event, individuals are able to participate in the outcome of that event and possible share in a prize award associated with the event.

U.S. Pat. No. 4,918,516 and the corresponding re-issue patent RE 34,340 describe a closed circuit interactive television system which provides a multichannel television signal from a localized headend which is used for individualized interactive selections by a plurality of users.

U.S. Pat. No. 5,462,275 to Lowe et al. describes a player interactive live action football game which may be played for example on a television screen.

U.S. Pat. No. 5,423,555 to Kidrin describes an interactive video game-television system wherein video game cartridge information is accessed in response to encoded signals transmitted with NTSC television signals.

U.S. Pat. No. 5,630,757 to Gagin et al. describes a complete multi-user game playing environment which provides game playing services to cable television subscribers over existing cable networks.

U.S. Pat. No. 5,190,285 to Levy et al. describes an electronic game with at least one, and preferably a plurality, of intelligent game pieces which each contain a re-programmable memory device.

U.S. Pat. No. 5,271,626 to Llenas et al. describes a television game for entertaining viewers and maintaining viewership during television programs and commercials.

U.S. Pat. No. 5,609,525 to Ohno et al. describes television or video game data reception apparatus which receives a data signal of television games transmitted from a base station in a wireless manner or through wire on a local station side so that the received data signal is used to play a game.

SUMMARY OF THE INVENTION

The present invention seeks to provide interactive games which are played via a communication network and with assistance of a television.

There is thus provided in accordance with a preferred embodiment of the present invention a gaming method for use with an interactive game which is played at a player unit having an interface device which is coupled to a television and to at least one communication network, the method including displaying, via the interface device, the interactive game on the television, capturing a picture of a player, transferring the picture of the player to a headend, processing the picture of the player to create an avatar of the player, electronically assimilating the avatar into the interactive game, and enabling the player to interactively play the interactive game by controlling the avatar via the at least one communication network.

Further in accordance with a preferred embodiment of the present invention the step of taking a picture of a player includes at least one of taking a video picture of the player and scanning an image of the player.

Still further in accordance with a preferred embodiment of the present invention the step of taking a picture of a player includes scanning a three-dimensional image of the player.

Additionally in accordance with a preferred embodiment of the present invention the processing step is performed in electronic processing equipment at the headend.

Moreover in accordance with a preferred embodiment of the present invention the step of transferring includes the step of transmitting the picture of the player via the at least one communication network.

Further in accordance with a preferred embodiment of the present invention the step of electronically assimilating the avatar in the interactive game includes inserting the avatar in a virtual studio environment.

Still further in accordance with a preferred embodiment of the present invention the method includes selecting, at the player unit, a basic avatar from a group of avatars, and confirming a selection of the basic avatar by transmitting an authorization signal.

Additionally in accordance with a preferred embodiment of the present invention the processing step includes combining, in response to acceptance of the authorization signal, the picture of the player with the basic avatar to create an avatar having combined characteristics of the player and of the basic avatar.

There is also provided in accordance with another preferred embodiment of the present invention a gaming method for use with an interactive game in which, at a first player unit, a first interface device is coupled to a first television and to a communication network, and at a second player unit, a second interface device is coupled to a second television and to the communication network, the method including displaying, via the first and second interface devices, the interactive game at the first and second televisions, and enabling a first player, playing at the first player unit, and a second player, playing at the second player unit, to play along with the interactive game by competing each against the other via the communication network.

There is also provided in accordance with another preferred embodiment of the present invention, for use with a system in which an interactive game is transmitted via a communication network to a multiplicity of viewer units, and in which each viewer unit includes an interface device and a television, and the interface device is coupled to the communication network, a gaming method for playing the interactive game at a player unit which is in two-way communication with a virtual reality kit activated by a player and including at least a two-way link with the player unit, and for viewing the game played by the player at the multiplicity of viewer units, the method including encoding, at a headend, a first version of the interactive game by employing a first gaming program code and transmitting the first version of the interactive game to the multiplicity of viewer units, encoding, at the headend, a second version of the interactive game by employing a second gaming program code and transmitting the second version of the interactive game to the player unit, enabling the player to interactively play the interactive game, via the virtual reality kit, by performing actions in a virtual reality environment defined by the second version of the interactive game, detecting the actions of the player and obtaining a stream of detection signals therefrom, transmitting the detection signals to the headend via the communication network, processing, at the headend, the detection signals to implement the actions of the player in an avatar which simulates the player, and electronically inserting the avatar in the first version of the interactive game which is transmitted to the multiplicity of viewer units.

Further in accordance with a preferred embodiment of the present invention the step of processing includes transforming the actions of the player to actions of the avatar in a virtual studio environment.

Still further in accordance with a preferred embodiment of the present invention the method also includes selecting a basic avatar from a group of avatars, confirming a selection of the basic avatar by transmitting an authorization signal to the headend, accepting the authorization signal at the headend, and combining a picture of the player with the basic avatar to create an avatar having combined characteristics of the player and of the basic avatar.

There is also provided in accordance with another preferred embodiment of the present invention, for use with a system in which an interactive game is transmitted via a communication network to a multiplicity of viewer units, and in which each viewer unit includes an interface device and a television, and the interface device is coupled to the communication network, a gaming method for playing the interactive game at a player unit, and for viewing the game played by the player at the multiplicity of viewer units, the method including encoding, at a headend, a first version of the interactive game which includes a first environment by employing a first gaming program code, and transmitting the first version of the interactive game to the multiplicity of viewer units, encoding, at the headend, a second version of the interactive game which includes a second environment by employing a second gaming program code, and transmitting the second version of the interactive game to the player unit, enabling the player to interactively play the interactive game in the second environment defined by the second version of the interactive game, and viewing, at the multiplicity of viewer units, the interactive game in the first environment defined by the first version of the interactive game.

Further in accordance with a preferred embodiment of the present invention the first environment includes an outer view environment of the game.

Still further in accordance with a preferred embodiment of the present invention the second environment includes an inner view environment of the game.

Additionally in accordance with a preferred embodiment of the present invention the first environment and the second environment include virtual studio environments.

Moreover in accordance with a preferred embodiment of the present invention the second version of the interactive game includes a pay program which is received over a separate data stream.

There is also provided in accordance with another preferred embodiment of the present invention a method of controlling a signal broadcast from a headend of a television system from a player unit operatively attached to the television broadcast system and being in two-way communication therewith, the method including broadcasting, from the headend, a perspective image of at least one three-dimensional character in an environment created by a virtual studio, transmitting, from the player unit, a control signal directed to the headend, modifying the perspective image of the at least one three-dimensional character at least partly in response to the control signal to produce a modified perspective image, and broadcasting the modified perspective image from the headend.

There is also provided in accordance with another preferred embodiment of the present invention a method for remotely customizing an avatar for broadcast from a headend of a television broadcast system, the method including providing a picture of a user of the television broadcast system, selecting a basic avatar from a group of avatars, confirming selection of the basic avatar by transmitting an authorization signal to the headend, accepting the authorization signal at the headend, and combining the picture of the user with the basic avatar to create an avatar having combined characteristics of the player and of the basic avatar.

There is also provided in accordance with another preferred embodiment of the present invention a gaming method for use with an interactive game which is played via a communication network in a plurality of modes, the method including enabling a first player, playing at a first player unit, to interactively play the interactive game in a first mode by controlling an avatar via the communication network, transmitting the interactive game played in the first mode to a plurality of viewer units, and in response to transmission of an authorization signal, enabling a second player, playing at one of the plurality of viewer units, to view the interactive game played in the first mode by the first player and to play along with the interactive game in a second mode by competing against the first player.

Further in accordance with a preferred embodiment of the present invention the method includes the step of storing results of the interactive game played in the second mode at the one of the plurality of viewer units.

Still further in accordance with a preferred embodiment of the present invention the method includes transmitting the results of the interactive game played in the second mode via the communication network to a headend when at least one of the results exceeds a predetermined threshold value.

There is also provided in accordance with another preferred embodiment of the present invention a player unit which is operable to be placed in two-way communication with a headend and at which an interactive game is playable by a player via a television, the player unit including a camera which is operative to take a picture of a player, and an interface device coupled to the camera, to the television, and to a communication network and operative to receive gaming inputs from the player and to transmit the gaming inputs and the picture of the player received from the camera to the headend via the communication network, wherein the gaming inputs include control signals operative to control operations of an avatar based on the picture of the player, and the avatar is electronically assimilated in the interactive game by a virtual studio.

There is also provided in accordance with another preferred embodiment of the present invention a gaming system including a headend which is coupled to a communication network, the headend including an encoder for encoding a first version of the interactive game by employing a first gaming program code to generate an encoded first version of the interactive game, and for encoding a second version of the interactive game by employing a second gaming program code to generate an encoded second version of the interactive game, a multiplexer for multiplexing the encoded first version of the interactive game and the encoded second version of the interactive game to produce a multiplexed signal, and a transmitter for transmitting the multiplexed signal to a plurality of viewers, a multiplicity of viewer units, each including a television and an interface device which is coupled to the communication network and is operative to receive, demultiplex and decode the first version of the interactive game by employing the first gaming program code, a player unit at which an interactive game is played by a player, the player unit including a player television, and a player interface device coupled to the player television, and to the communication network, wherein the player interface device is operative to receive, demultiplex and decode the second version of the interactive game by employing the second gaming program code, and a player interface kit which includes at least a two-way link with the player unit, and the player interface kit is operative to detect actions performed by the player, to obtain a stream of detection signals therefrom, and to transmit the stream of detection signals to the headend via the player interface device and the communication network, and detection signals are employed at the headend to implement the actions of the player in an avatar which simulates the player, the avatar being electronically inserted in the first version of the interactive game which is transmitted to the multiplicity of viewer units.

Further in accordance with a preferred embodiment of the present invention the first version of the interactive game includes an outer view environment of the interactive game, and the second version of the interactive game includes an inner view environment of the interactive game.

There is also provided in accordance with another preferred embodiment of the present invention a gaming system including a headend which is coupled to a communication network, the headend including an encoder for encoding a first version of the interactive game which includes a first environment by employing a first gaming program code to generate an encoded first version of the game, and for encoding a second version of the interactive game which includes a second environment by employing a second gaming program code to generate an encoded second version of the game, a multiplexer for multiplexing the encoded first version of the interactive game and the encoded second version of the interactive game to produce a multiplexed signal, and a transmitter for transmitting the multiplexed signal to a plurality of viewers, a multiplicity of viewer units, each including a television and an interface device which is coupled to the communication network and is operative to receive, demultiplex and decode the first version of the interactive game by employing the first gaming program code, and to enable a viewer to view the interactive game in the first environment defined by the first version of the interactive game, and a player unit at which an interactive game is played by a player, the player unit including a player television, and a player interface device coupled to the player television, and to the communication network, wherein the player interface device is operative to receive, demultiplex and decode the second version of the interactive game by employing the second gaming program code, and to enable the player to interactively play the interactive game in the second environment defined by the second version of the interactive game.

Further in accordance with a preferred embodiment of the present invention the first version of the interactive game and the second version of the interactive game are transmitted on separate data streams.

Still further in accordance with a preferred embodiment of the present invention the second version of the interactive game is a pay program which is received over a separate data stream.

Additionally in accordance with a preferred embodiment of the present invention the first environment includes an outer view environment of the game and the second environment includes an inner view environment of the game.

Moreover in accordance with a preferred embodiment of the present invention the first environment and the second environment are virtual studio environments.

Further in accordance with a preferred embodiment of the present invention the player interface kit includes a virtual reality kit.

BRIEF DESCRIPTION OF THE DRAWINGS

The present invention will be understood and appreciated more fully from the following detailed description, taken in conjunction with the drawings in which:

FIG. 5 is a block diagram illustration of a transmitting assembly which forms part of the headend of FIG. 3 and is constructed and operative in accordance with a preferred embodiment of the present invention;

FIG. 8 is a flow chart illustrating another preferred play along method which is associated with the gaming method described in FIGS. 6A and 6B.

DETAILED DESCRIPTION OF PREFERRED EMBODIMENTS

Figure 1:
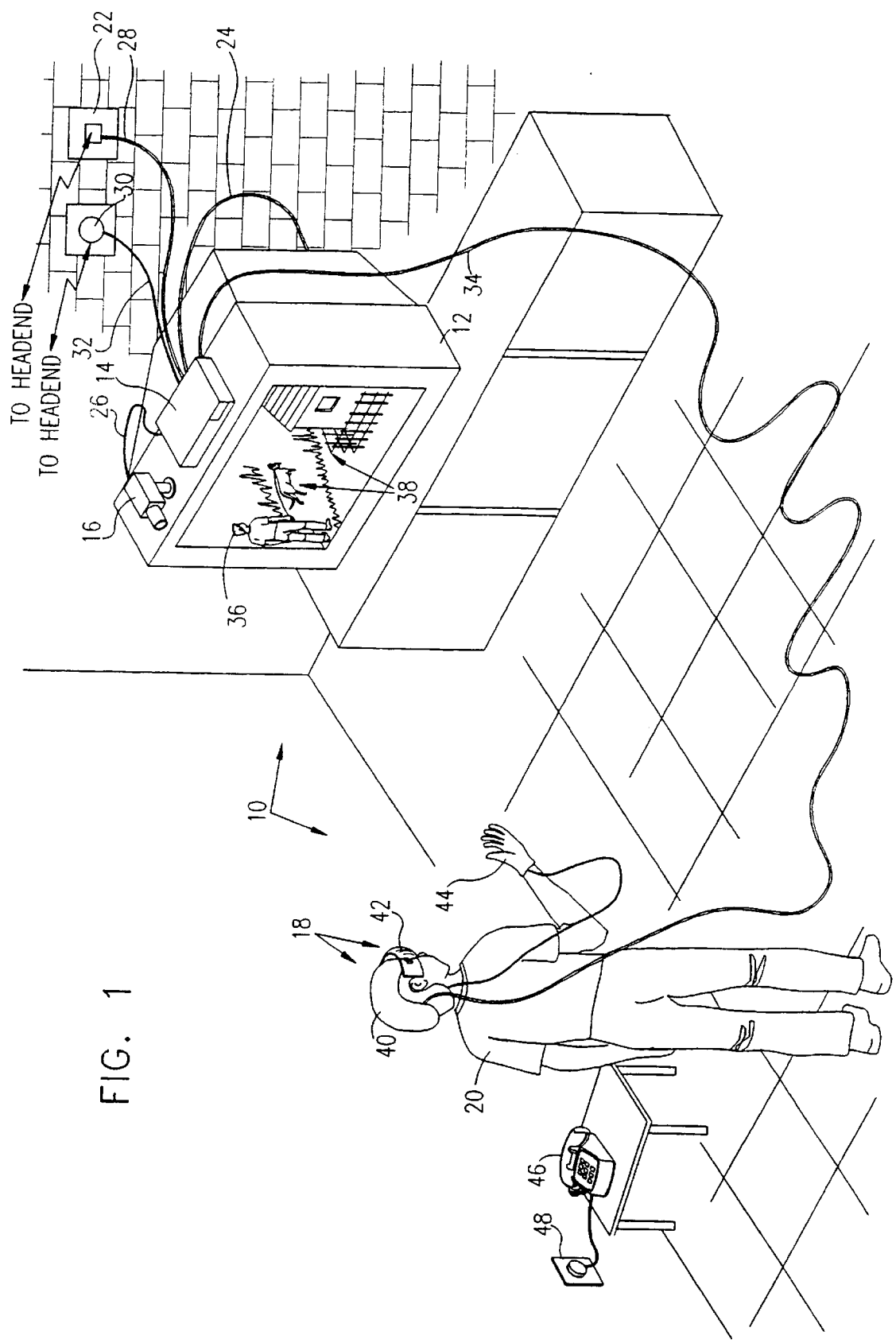
FIG. 1 is a simplified pictorial illustration of a player unit in an interactive game system constructed and operative in accordance with a preferred embodiment of the present invention.

Reference is now made to FIG. 1, which is a simplified pictorial illustration of a player unit 10 in an interactive game system constructed and operative in accordance with a preferred embodiment of the present invention.

The player unit 10 of FIG. 1 preferably includes a television 12, an interface device such as a set-top box (STB) 14, as is well known in the art, a video camera 16 and a virtual reality kit 18 which is worn and activated by a player 20. It is appreciated that, alternatively to the virtual reality kit 18, any other appropriate user interface kit, such as a joy stick or a telephone keypad input device, may be used. Without limiting the generality of the meaning of the term "user interface kit", the virtual reality kit 18 is believed to be preferable, and is generally described herein.

Preferably, the STB 14 is coupled to the television 12, to the video camera 16 and to a radio-frequency (RF) wall outlet 22 via coaxial cables 24, 26 and 28 respectively. The STB 14 is also preferably coupled to a telephone wall outlet 30 via a twisted pair 32. Preferably, the wall outlet 22 is in turn connected to a television network (not shown), and the telephone wall outlet 30 is connected to a telephone network (not shown).

In a preferred embodiment of the present invention the virtual reality kit 18, which is activated by the player 20, is coupled to the STB 14 via cable 34. Preferably, operations performed by the player 20 are sensed by conventional detectors (not shown) in the virtual reality kit 18 and transferred, via cable 34, to the STB 14. Alternatively to the cable 34, an appropriate wireless interface, such as an infrared wireless interface, may be used, and is typically preferred.

In a preferred embodiment of the present invention the player 20 is an interactive player in an interactive game show which is broadcast to a plurality of viewers, including the player 20. Preferably, the interactive player 20 interactively controls an avatar 36 which is displayed on the television 12 by activating various functions in the virtual reality kit 18. The avatar 36 is preferably a three-dimensional avatar which is navigated and controlled by the player 20 through a changing three-dimensional gaming environment 38 which is displayed on the television and forms part of the interactive game show.

Preferably, the virtual reality kit 18 is a conventional virtual reality kit which may include units such as a helmet 40 with a display 42 which typically provides a simulated three-dimensional view as is well-known in the art, a microphone and sensors (not shown) and a glove 44 with sensors (not shown). When the player 20, that wears the helmet 40 and the glove 44, makes a movement by moving a hand on which he wears the glove 42, or by moving his head, the movement is sensed by the corresponding sensors which generate a detection signal in response to the movement.

It is appreciated that the display 42 may be excluded, and the player may view the game on the television 12 rather than on the display 42, and may respond to challenges displayed on the television 12 by moving the hand or the head. Alternatively, in a case where the display 42 is provided, the display on the television 12 may be ignored.

The detection signal is preferably transmitted via the cable 34 to the STB 14, and from the STB 14 to a headend, described hereinafter with reference to FIG. 3, via the telephone network or via the television network and is employed to control the avatar 36 through the gaining environment 38. Alternatively to the telephone network or the television network, any other appropriate telecommunications network, such as, for example, the Internet or a satellite-based communications network, may be used.

In another preferred embodiment of the present invention the virtual reality kit 18 may be excluded and the player 20 may control the avatar 36 by operating keys of a touch-tone telephone 46 which is coupled to the telephone wall outlet 30 or to an additional telephone wall outlet 48.

It is appreciated that the telephone network and the television network may be replaced by any other conventional two-way communication network. For the purposes of the present specification, the term "two-way communication network" is used in a broad sense to include any form of two-way wired and wireless RF networks, such as a two-way television network, a two-way cable television network and a two-way satellite communication network, as well as twoway wired and wireless telephone networks and two-way wired and wireless optical networks, such as a fiber-optic network, and a wireless infrared optical communication network.

Additionally, the term "two-way communication network" also includes any form of hybrid communication networks such as a one-way television network and a two-way telephone network as applied in conventional state-of-the-art pay television systems.

It is appreciated that the definition of "two-way communication network" provided above also includes a very wide variety of communication systems including, for example, the Internet, other networks using Internet protocols, local area networks (LANs), wide area networks (WANs), and personal area networks (PANs).

Figure 2:
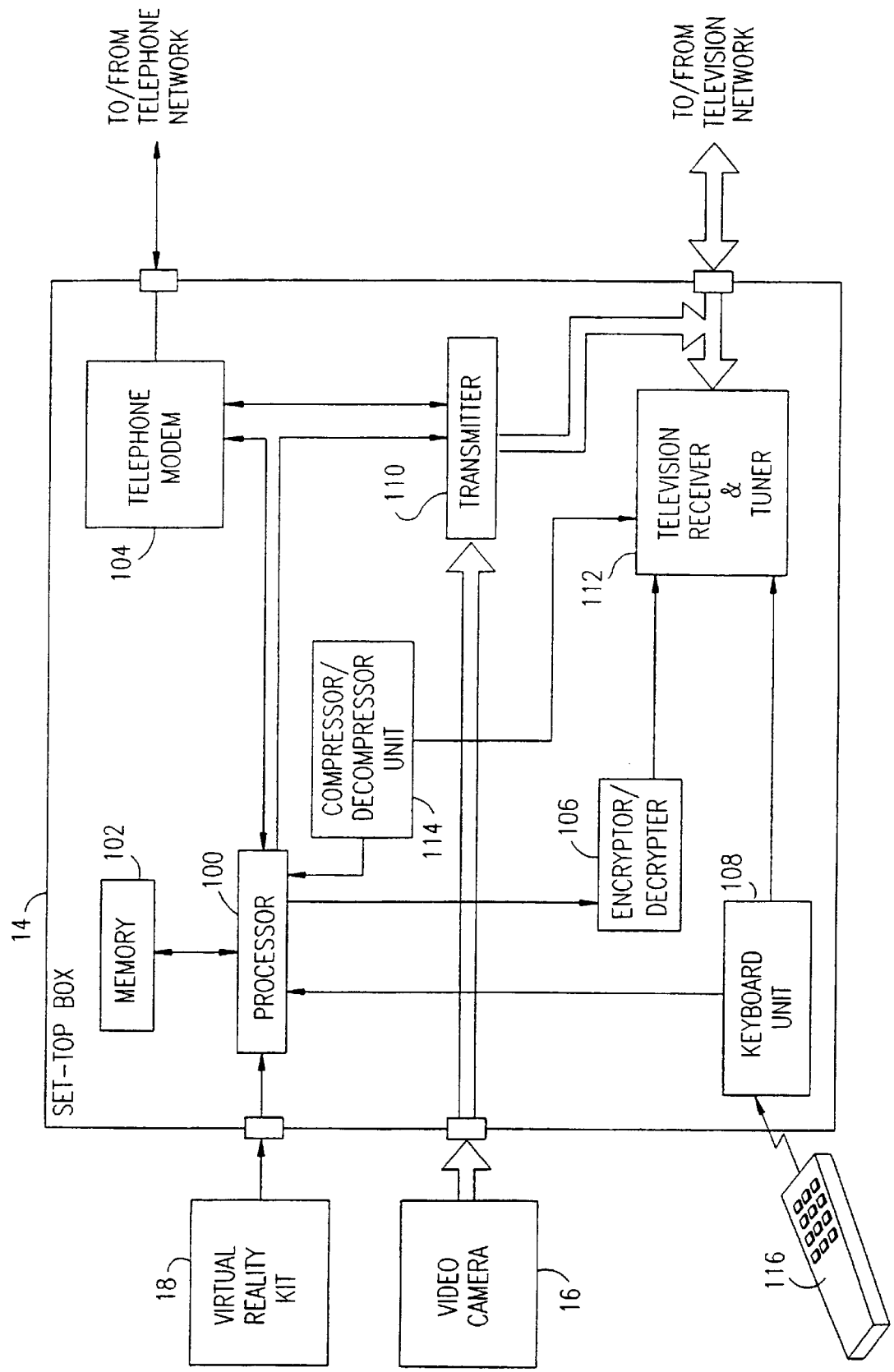
FIG. 2 is a block diagram illustration of a preferred implementation of a set-top box which forms part of the player unit of FIG. 1.

Reference is now made to FIG. 2 which is a block diagram illustration of a preferred implementation of the STB 14 which forms part of the player unit of FIG. 1.

Preferably, STB 14 includes a processor 100, a memory 102, a telephone modem 104, an encryptor/decrypter 106, a keyboard 108, a transmitter 110, a television receiver and tuner 112, and a compressor/decompressor unit 114. The processor 100 preferably receives inputs and selections from virtual reality kit 18, from keyboard unit 108 and from the telephone network via the modem 104. In a preferred embodiment of the present invention the processor 100 may also receive inputs and selections from a remote control 116, which are shown as transmitted via the keyboard unit 108 but which may alternatively be transmitted via another interface unit (not shown).

Preferably, the processor 100 communicates in two-way communication with the memory 102, with the compressor/ decompressor unit 114 and with the encryptor/decrypter 106. It is appreciated that the compressor/decompressor unit 114 may compress/decompress information provided from and to the processor 100 as the case may be, and the encryptor/decrypter 106 may encrypt/decrypt information provided from and to the processor 100 as the case may be.

In a preferred embodiment of the present invention the processor 100 provides information generated thereat to the transmitter 110 for transmission over the television network or over the telephone network. The transmitter 110 may also receive video information from the video camera 16 of FIG. 1 and transmit the video information via the television network or the telephone network.

Preferably, the television receiver and tuner 112 is operative to provide conventional receiving, demultiplexing and tuning of television transmissions received from the television network. It is appreciated that in state-of-the-art television systems, the television transmissions comprise digitally compressed and encrypted television transmissions. Accordingly, the television receiver and tuner 112 may be a conventional integrated receiver and decoder (IRD) which receives, demultiplexes and decodes the television transmissions, and the compressor/decompressor unit 114 and the encryptor/decrypter 106 may be employed to decompress the transmissions and to decrypt the transmissions respectively. It is appreciated that many IRDs already include the decompression and the decryption functions.

It is further appreciated that if another communication network is employed, as mentioned above, all the transmission and reception functions may be performed via the communication network.

Figure 3:
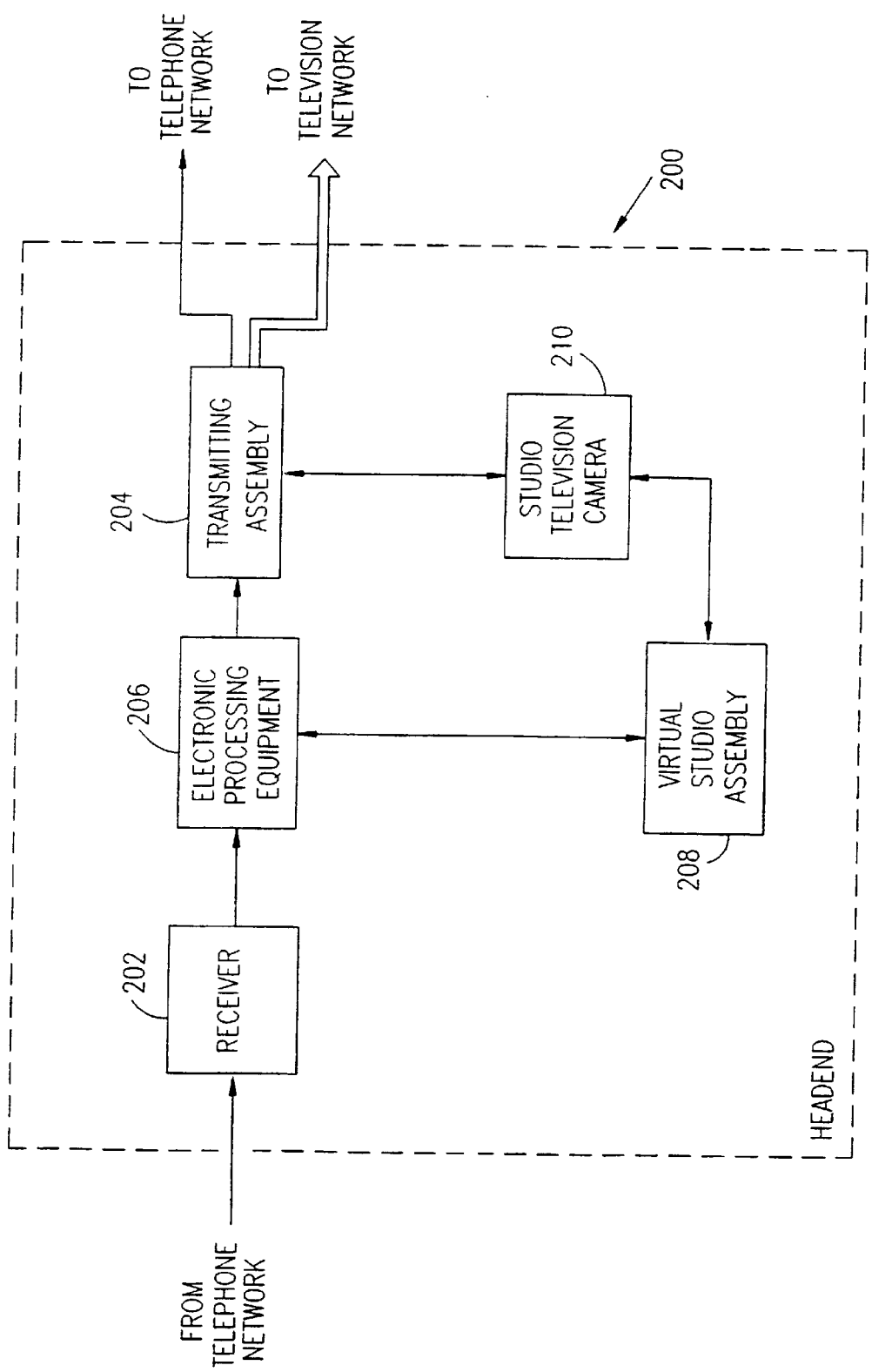
FIG. 3 is a block diagram illustration of a headend in an interactive game system constructed and operative in accordance with a preferred embodiment of the present invention.

Reference is now made to FIG. 3 which is a block diagram illustration of a headend 200 in an interactive game system constructed and operative in accordance with a preferred embodiment of the present invention.

Preferably, the headend 200 communicates with a multiplicity of viewer units via the television network and via the telephone network which are mentioned above with reference to FIGS. 1 and 2. If the television network comprises a two-way television network, the headend 200 may transmit and receive information over the television network. If the television network comprises a oneway television network, the headend may transmit information over the television network, and receive and transmit information over the telephone network. As mentioned above, other communication networks may be employed, as long as they support two-way communication.

The headend 200 may preferably include a receiver 202 and a transmitting assembly 204 for respectively receiving and transmitting gaming inputs and control information over the communication network. If a hybrid television and telephone network is employed, as illustrated in FIG. 3, the receiver 202 may receive the gaming inputs and the control information over the telephone network and the transmitting assembly 204 may transmit information over the television network as well as over the telephone network.

In a preferred embodiment of the present invention the headend 200 also includes electronic processing equipment 206 which is coupled to the receiver 202 and to the transmitting assembly 204. Preferably, the electronic processing equipment 206 is also coupled to a virtual studio assembly 208 which may form part of the headend 200 or may be coupled thereto.

The virtual studio assembly 208 is preferably a conventional virtual studio assembly which is typically employed to provide virtual and graphical environments in programs which incorporate live actors, and in animated programs or programs which combine animated environments and animated characters with live actors. Virtual studio services have been applied, for example, in the 1996 election coverage in Israel to provide graphical interpretation of expected seats in Parliament assigned to various political parties, and similarly in coverage of the 1996 federal elections in the United States. Typical virtual studio systems and systems for use therewith are commercially available from Dream Team Ltd., 3 Maskit Street, Herzliya Pituach, Israel and from RT.SET and ORAD, also of Israel.

In a preferred embodiment of the present invention the virtual studio assembly 208 is coupled to a studio television camera 210 which is operative to provide a video movie picture which includes an interactive game show that combines animated environments and animated characters generated at the virtual studio assembly 208 with live actors. It is appreciated that the studio television camera 210 may be part of the virtual studio assembly 208 and may supply video images thereto which are processed by the virtual studio assembly 208 and typically combined with other images, including, for example, computer-generated graphic and/or animated images.

Preferably, the interactive game show which is generated in the way described above is provide to the transmitting assembly 204, and is transmitted by the transmitting assembly 204 to a multiplicity of viewer units (not shown) via the communication network.

In a preferred embodiment of the present invention, the information received at the headend 200 is provided by the multiplicity of viewer units, and part of the information may include pictures of players and selections of animated characters from a group of basic animated characters which may be employed as basic avatars in interactive games. The term "avatar" as used throughout the present specification refers to an embodiment or personification, typically a video embodiment or personification, of a person which is typically combined with other video images in a virtual studio, as described above, to produce a combined representation in which the avatar represents the person. Typically, but not necessarily, an avatar associated with a person embodies or personifies some physical or personality characteristics of the person, possibly in caricatured form.

Preferably, a player is selected to be an interactive player who interactively participates in the interactive game show. The player may preferably be selected by an audience that views the game show, by a manager of the game show, or automatically based on a predetermined criterion, such as previous game playing history of the viewer who wishes to be a player.

In a preferred embodiment of the present invention the selected player is invited to participate in the game show. If the player agrees, he is requested to send a picture of himself, or a picture of another person, to the headend via the communication network, and to select a basic avatar from the group of basic avatars to which his picture is adapted.

Preferably, in order for the selected player to be able to participate in the game, the player must make a payment by transmitting a payment authorization signal associated with a selection of a basic avatar. Once the payment authorization signal is received and processed in a billing system (not shown) at the headend 200, the player is authorized to interactively play the game.

It is appreciated that transmission of the pictures of the players may be unrelated in time and in means of communication to the game show, and may be transmitted at any appropriate time, such as at a time when the game show is not played and via other communication networks, such as via the Internet. Thus, a bank of pictures of players may be established at the headend 200, and a player may be selected by selecting from among those having a picture in the bank of players.

In a preferred embodiment of the present invention, the picture of the selected player is provided to the electronic processing equipment 206 and is processed thereat. Then, a processed picture of the player is provided to the virtual studio assembly 208 which adapts the picture of the player to the basic avatar selected from the group of basic avatars, and combines the picture of the player with the basic avatar to create an avatar having combined characteristics of the player and of the basic avatar. Typically, the avatar having combined characteristics of the player and of the basic avatar includes a body of the basic avatar and the head of the player as extracted from the picture of the player, and this combination may be preferred.

Preferably, the avatar having combined characteristics of the player and of the basic avatar is inserted in the game which is transmitted, by the transmitting assembly 204, to the multiplicity of viewer units so that any viewer that views the interactive game show sees the game as played by the selected player, and the avatar having combined characteristics of the player and of the basic avatar.

In another preferred embodiment of the present invention each viewer whose picture is transmitted to the headend 200 may view the game show with an avatar having the face of that viewer combined thereto. The combination of the face of the viewer with the avatar is made as described above for the selected viewer avatar, and the transmitting assembly 204 at the headend may transmit a corresponding avatar to each viewer. It is appreciated that, alternatively, the combination of the face of the viewer with the avatar may be made in the set top box 14, in which case it would be possible for different viewers other than the play to each combine their face with the player's avatar.

In yet another preferred embodiment of the present invention each viewer may store a preferred combination of an avatar having the face of the viewer combined thereto in a memory at a viewer unit set-top box, such as memory 102 of FIG. 2.

It is appreciated that each picture of each viewer and the picture of the player may be taken by a video camera, such as video camera 16 of FIG. 1. Alternatively or additionally, each picture may be taken by a scanner (not shown), such as a conventional three-dimensional scanner, in which case the picture may comprise a three-dimensional digital representation. In another preferred embodiment of the present invention, each picture may be enhanced by a scanner having image processing capabilities.

Figure 4:
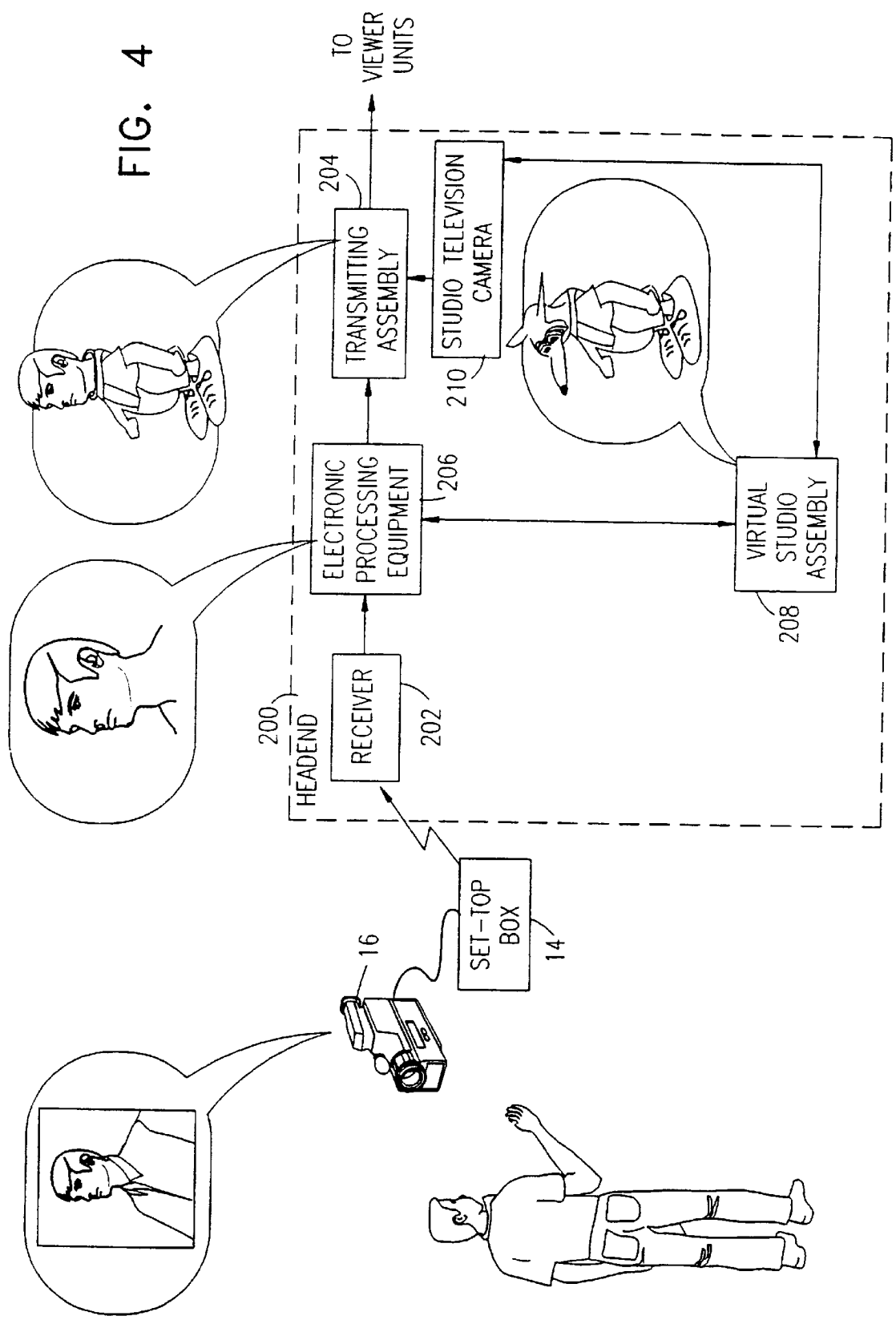
FIG. 4 is a simplified pictorial illustration of systems participating in creation of an avatar having combined characteristics of a player and of a basic avatar, and of the creation of the avatar.

Reference is now made to FIG. 4 which is a simplified pictorial illustration of a preferred embodiment of systems participating in creation of an avatar having combined characteristics of a player and of a selected basic avatar, and of the creation of the avatar.

Preferably, the video camera 16 takes a picture of a player. The picture of the player typically includes at least the face of the player as shown in illustrative form in FIG. 4 above the camera 16.

The picture of the player is preferably transmitted to the headend 200 via the STB 14. At the headend 200, the picture is received at receiver 202 of FIG. 3 and provided to the electronic processing equipment 206 of FIG. 3.

At the electronic processing equipment 206, the picture of the player is captured and an image of the face of the player is separated from the rest of the picture as shown in illustrative form above the electronic processing equipment 206. Then, the image of the face of the player is communicated to the virtual studio assembly 208 at which a basic avatar, such as a rabbit, is created as shown in illustrative form above the virtual studio assembly 208.

Preferably, at the virtual studio assembly 208, or at the electronic processing equipment 206, the face of the player is combined with the chosen basic avatar, e.g. the rabbit, to provide the avatar having combined characteristics of the player and of the basic avatar as mentioned above with reference to FIG. 3, the basic avatar being electronically assimilated in the interactive game and transmitted via the transmitting assembly 204 to the multiplicity of viewer units. The avatar having combined characteristics of the player and of the basic avatar is shown in illustrative form above the transmitting assembly 204.

It is appreciated that if the electronic processing equipment 206 is embedded in the virtual studio 208, all the processing that is mentioned above is performed in the virtual studio assembly 208.

Reference is now made to FIG. 5 which is a block diagram illustration of the transmitting assembly 204 which forms part of the headend 200 of FIG. 3.

In a preferred embodiment of the present invention the transmitting assembly 204 includes an encoder 300 which is operative to encode a first version of the interactive game by employing a first gaming program code, and to encode a second version of the interactive game by employing a second gaming program code.

Preferably, the encoder 300 is coupled to a multiplexer (MUX) 302 which is operative to multiplex an encoded first version of the interactive game and an encoded second version of the interactive game so as to produce a multiplexed signal. The multiplexed signal is provided to a transmitter 304 which is operative to transmit the multiplexed signal to a plurality of viewers.

Typically, the multiplexer 302 may be combined with the encoder 300 in an MPEG unit, as is well known in the art, which typically combines multiplexing and compression with other features appropriate to digital video transmission. Operation of typical commercially-available MPEG units is generally described in published standards such as the ISO/IEC 13818-6 International Standard entitled "Coding of Moving Pictures and Associated Audio."

It is appreciated that if the signal transmissions are in digital form, the encoder 300 may include a digital encoder, the multiplexer 302 may include a digital multiplexer and the transmitter 304 may include a digital transmitter. Preferably, the encoder 300 may encode other television programs as well as the first and second versions of the game show, and the multiplexer 302 may multiplex encoded television programs as well as the encoded first and second versions of the interactive game.

In a preferred embodiment of the present invention the first version of the interactive game may include a version of the game that is transmitted to all viewers that do not participate as interactive players in the game. Preferably, the second version of the interactive game may include a version of the game which is transmitted only to the player or players who is or are selected to interactively play the game as mentioned above. It is appreciated that the first version of the game may be different from the second version of the game. A preferred embodiment of first and second versions of the interactive game, and the differences between them are described below with reference to FIGS. 6A and 6B.

Figure 6A:
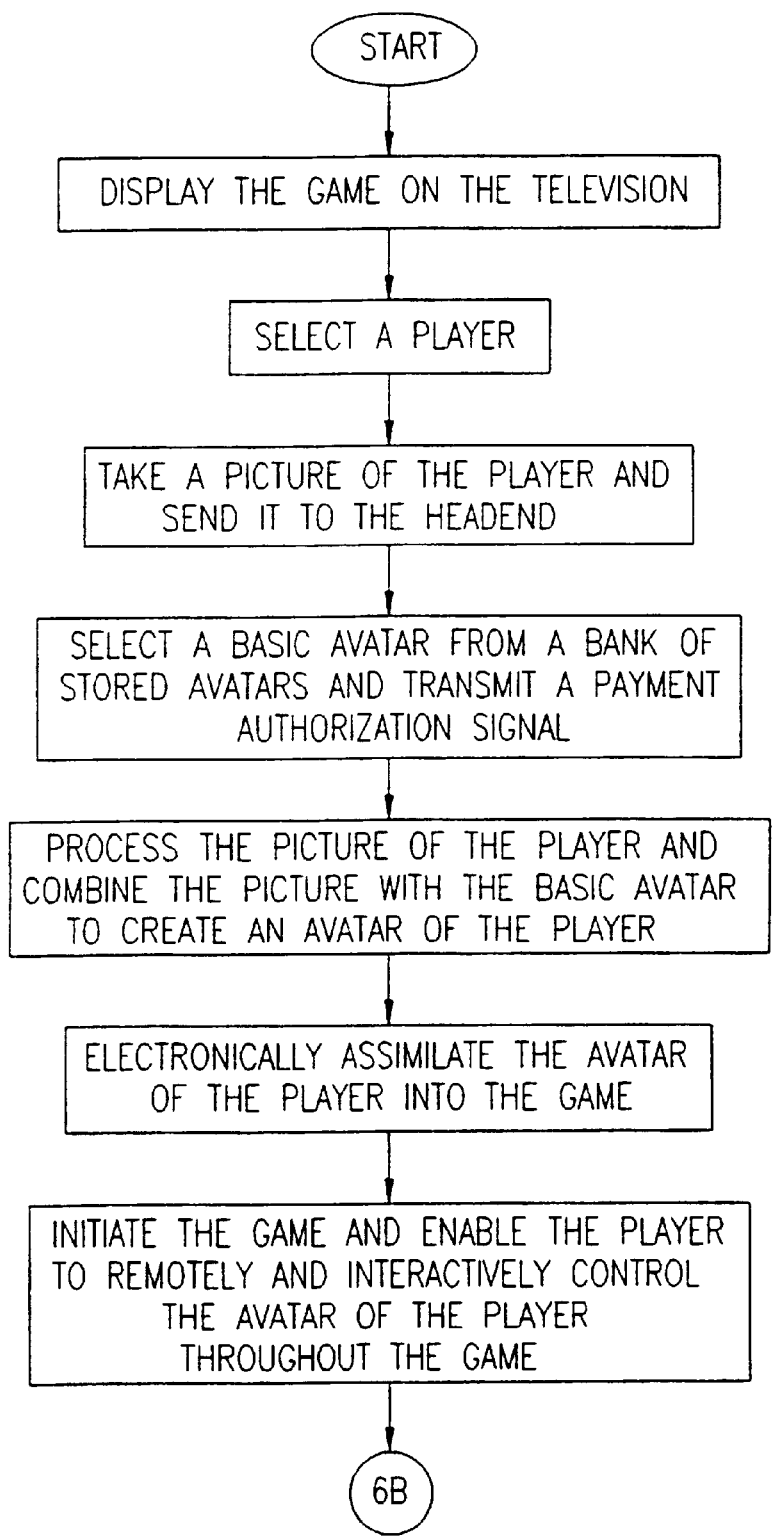
FIGS. 6A and 6B together constitute a flow chart illustrating a preferred gaming method for use with an interactive game which is operative in accordance with a preferred embodiment of the present invention.
Figure 6B:
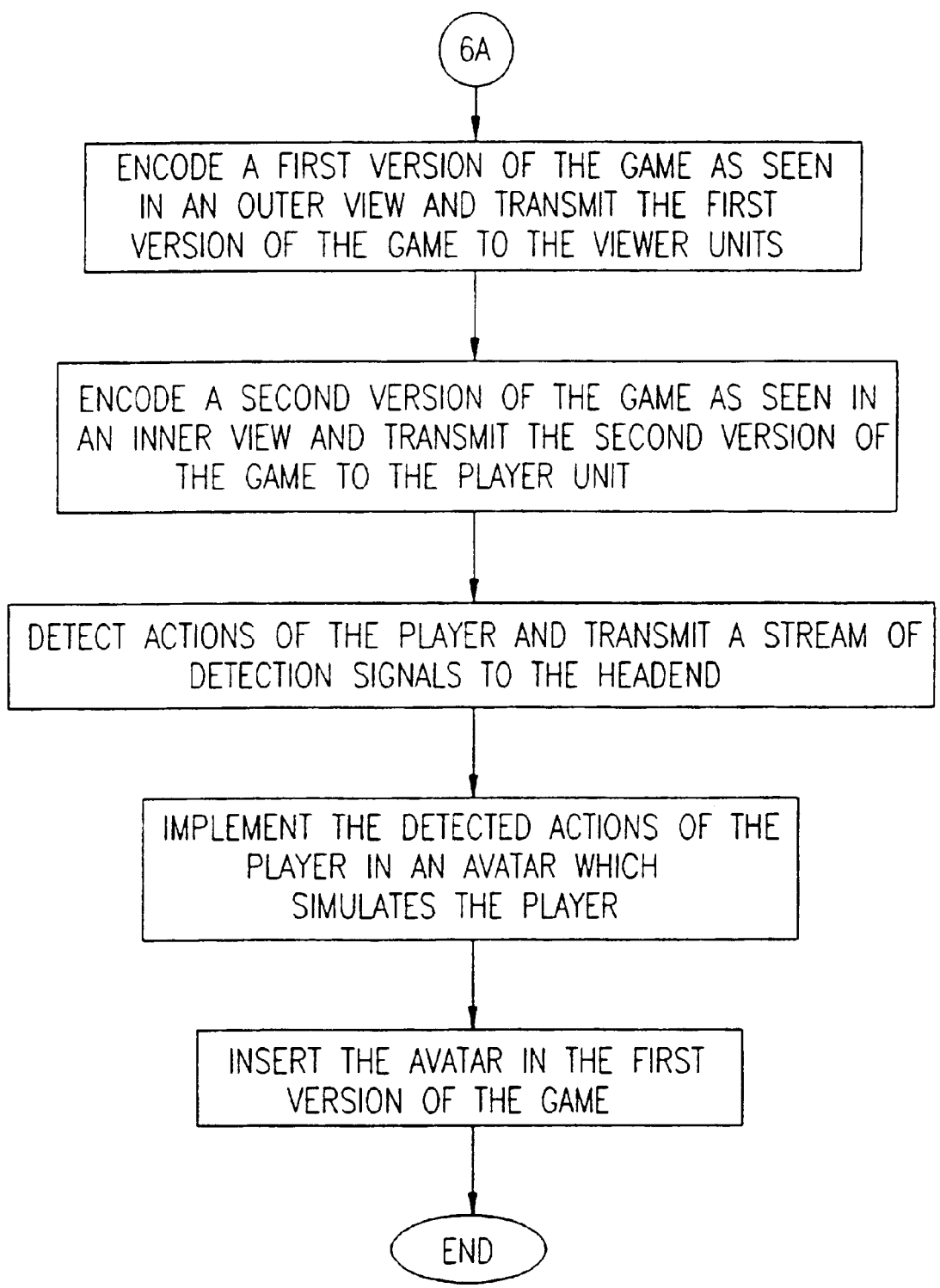

Reference is now made to FIGS. 6A and 6B which together constitute a flow chart illustrating a preferred gaming method for use with an interactive game show which is played by employing the apparatus and systems FIGS. 1–5.

In a preferred embodiment of the present invention the interactive game show is displayed on the television 12 at the player unit 10 of FIG. 1. At any time prior to the show, or during the show, a viewer may be selected to be an interactive player in the game. Preferably, the selection of the viewer as a player may be performed by placing a telephone call to the viewer's residence an informing him of the selection, or by transmitting a selection message which is individually addressed to the viewer.

Once the player is selected, and upon his acceptance to participate in the game which may be confined by transmitting a payment authorization signal to the headend, the player may preferably be requested to send an electronic image of his face to the headend 200 at which the game is managed. Then, the player may preferably operate video camera 16 to photograph himself. Alternatively, the player may use a conventional scanner, or a conventional three-dimensional scanner, to generate a scanned image of his face.

In a preferred embodiment of the present invention the picture of the player may be transferred to the headend 200, either by mail or by transmitting the image of the player via a communication network to which the headend 200 is coupled, such as a television network or the Internet.

Preferably, the picture of the player is processed at the electronic processing equipment 206 at the headend 200 to create an avatar of the player. It is appreciated that the avatar may include a combination of the face of the player with a body of the basic avatar, or a combination of a face of the basic avatar with the body of the player, and thus the avatar includes combined characteristics of the player and of the basic avatar.

Preferably, the avatar of the player is electronically assimilated into the interactive game, and the player is enabled, upon initialization of the game, to interactively play the interactive game by controlling the avatar via the communication network. It is appreciated that assimilation of the avatar may include inserting the avatar in a virtual studio environment.

If the player uses a virtual reality kit to play the game, such as the virtual reality kit 18 of FIG. 1, the player plays the game in a realistic environment, typically an environment as viewed by him when he is "implanted" as an avatar in the game. For the purposes of the present invention the term "inner view" is used to include such a view of the game as seen by the player when he forms part of the game from the view of the player's avatar.

It is appreciated that viewers that do not play the game, but rather just watch it played by the player, are generally not interested in viewing the game from the inner view of the player. Typically, such viewers, may see the environment of the game from an "outer view". The term "outer view" is used in the present specification to include a view of an outside viewer that watches the player as well as the environment in which the player acts.

In a preferred embodiment of the present invention a first version of the interactive game is encoded at the headend 200 by employing a first gaming program code. The term "gaming program code" is used throughout the present specification to refer to a code or any other appropriate method used to assign one or more destinations to a version associated with the code. The first version of the game preferably includes an outer view environment of the game, and this version is transmitted to a multiplicity of viewer units.

Preferably, a second version of the interactive game is also encoded at the headend. The second version of the game preferably includes an inner view environment of the game, and this version is transmitted to the player unit only. It is appreciated that the second version of the game is encoded by employing a second gaming program code which differs from the first gaming program code. In a preferred embodiment of the present invention the inner view environment of the game and the outer view environment of the game are virtual studio environments.

In a preferred embodiment of the present invention the player is enabled to interactively play the interactive game, via the virtual reality kit 18, by performing actions in a virtual reality environment defined by the second version of the interactive game. Preferably, the actions of the player are detected by the virtual reality kit 18 and a stream of detection signals is obtained therefrom.

The detection signals are transmitted to the headend 200 via the communication network. At the headend 200, the detection signals are processed to implement the actions of the player in an avatar which simulates the player. Preferably, the avatar is electronically inserted in the first version of the interactive game which is transmitted to the multiplicity of viewer units. It is appreciated that the processing of the detection signals may include transforming the actions of the player to actions of the avatar in a virtual studio environment. It is further appreciated that the second version might alternatively be provided to viewers in addition to the player, typically for a fee.

As mentioned before with reference to other preferred embodiments of the present invention, the avatar may include an avatar having combined characteristics of the player of a basic avatar.

It is appreciated that the first and second versions of the game which provide separate views of the game may be used in a configuration which does not employ the virtual reality kit 18. In such a case, the player may manipulate keys of an input device, for example, a touch-tone telephone or a joy-stick (not shown), to interactively play the interactive game while viewing a second environment defined by the second version of the interactive game, i.e. the environment seen from the inner view. Preferably, other viewers may watch the interactive game while viewing a first environment defined by the first version of the interactive game, i.e. the environment seen from the outer view. Preferably, the first environment and the second environment may be virtual studio environments.

In a preferred embodiment of the present invention, the interactive game which is played by the player, i.e. the second version of the game, may be defined as a pay program. In such a case, the pay program may occupy a separate data stream, if the pay program is transmitted in a digital form, or a separate pay television channel if the pay program is transmitted in an analog form. It is further appreciated that the data stream may be dynamic and may vary in accordance with bandwidth allocations, as is well known in the art, particularly in relation to MPEG, as referred to above.

It is appreciated that the playing methods of the present invention enable controlling a signal broadcasted from a headend of a television system from a player unit operatively attached to the television broadcast system and being in two-way communication therewith. In a preferred embodiment of the present invention, a perspective image of at least one three-dimensional character in an environment created by a virtual studio is broadcast from the headend.

Preferably, a control signal which is directed to the headend is transmitted from the player unit. The control signal is employed to modify the perspective image of the at least one three-dimensional character so as to produce a modified perspective image which is further broadcasted from the headend.

In a preferred embodiment of the present invention the signal broadcasted from a headend may include an avatar which may be remotely customized for broadcast from a headend of a television broadcast system. Preferably, in order to customize the avatar, a picture of a user of the television broadcast system is provided and a basic avatar is selected from a group of avatars. When a selection of the basic avatar is confirmed by transmitting a payment authorization signal to the headend, and the payment authorization signal is accepted at the headend, the picture of the user is combined with the basic avatar to create an avatar having combined characteristics of the player and of the basic avatar.

Figure 7:
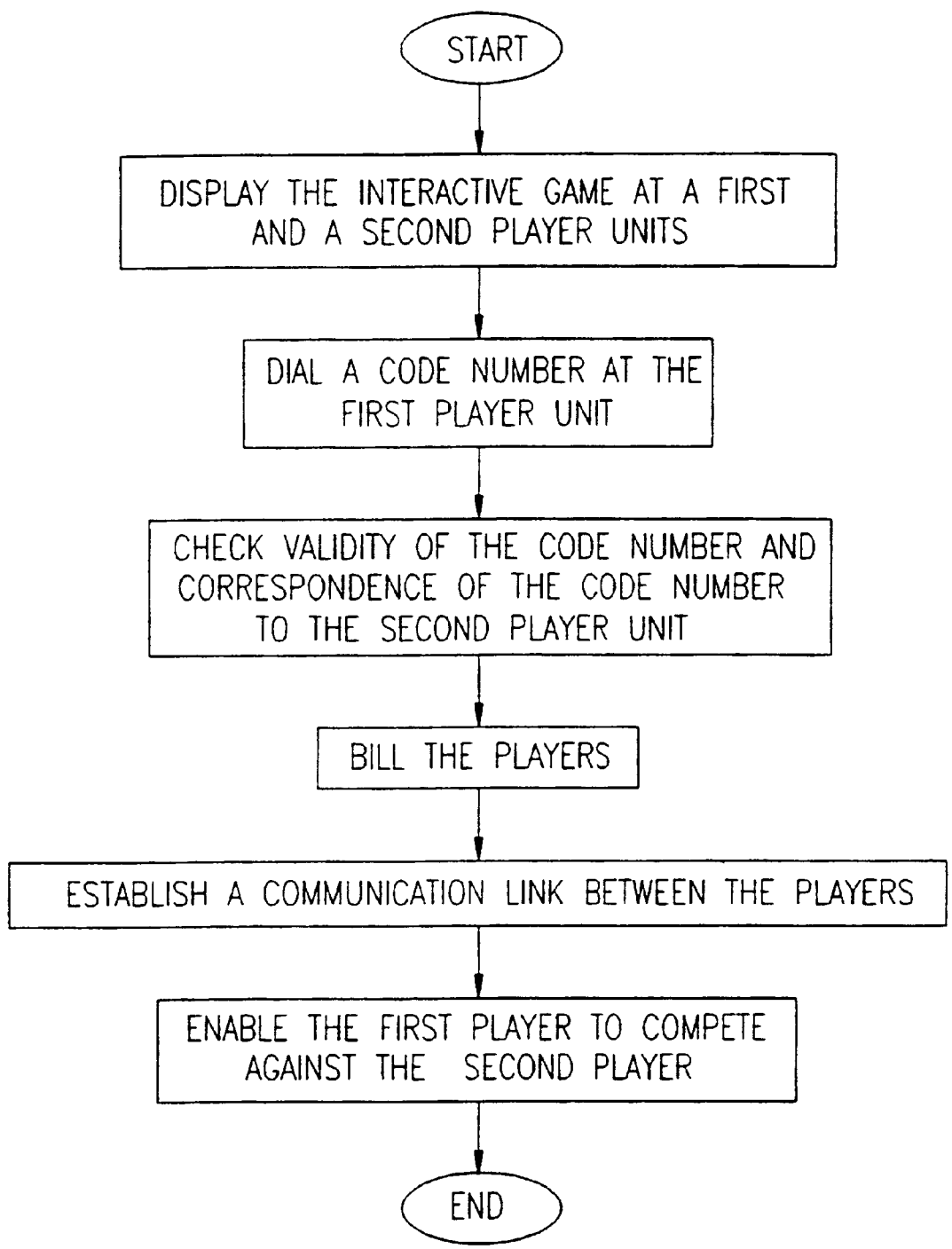
FIG. 7 is a flow chart illustrating a preferred play along method which is associated with the gaming method described in FIGS. 6A and 6B.

In another preferred embodiment of the present invention a viewer that was not selected to be an interactive player in the game may still play the game in various play along modes which are described herein with reference to FIGS. 7 and 8.

Reference is now made to FIG. 7 which is a flow chart illustrating a preferred play along method which is associated with the gaming method described in FIG. 6.

Preferably, a first player and a second player, which are not selected to be interactive players in the game, may view the game show on a first and a second television at respective player units and may decide to compete each against the other.

In such a case, the first player may dial a code number of the second player on a telephone, or enter an identification code of the second player via a remote control, such as remote control 116 of FIG. 2.

Preferably, the code number, or the identification code, is transmitted to the headend 200 via an STB, such as STB 14 of FIG. 1, and via a communication network, such as the communication network mentioned above with reference to FIGS. 2 and 3.

At the headend 200, the code number or the identification code is checked against a list of viewers, and if a match is found with a code of a viewer, which in this case is the code of the second player, the headend 200 establishes a communication link between the first player and the second player, and enables the first player, playing at the first player unit, and the second player, playing at the second player unit, to play along the interactive game by competing each against the other via the communication network.

In a preferred embodiment of the present invention the first player and the second player may be each requested, by the headend 200, to transmit to the headend 200 a payment authorization signal representing a charge to be paid by each player for participating in the play along mode of the game.

Reference is now made to FIG. 8 which is a flow chart illustrating another preferred play along method which is associated with the gaming method described in FIG. 6.

Preferably, a first player is selected to be an interactive player which is enabled to play the interactive game at a first player unit in a first mode by controlling an avatar via a communication network, such as the communication network mentioned above with reference to FIGS. 2 and 3.

In a preferred embodiment of the present invention the interactive game played in the first mode is transmitted to a plurality of viewer units. Preferably, a second player is enabled, in response to transmission of a payment authorization signal, to view the interactive game played in the first mode by the first player and to play along the interactive game in a second mode by competing against the first player.

It is appreciated that the game played in the second mode is typically played at a second player unit and is not transmitted to the plurality of viewer units. Rather, the results of the game played in the second mode may be stored in a memory at the second player unit, such as the memory 102 of FIG. 2. The results may be transmitted to the headend 200, typically at hours of non-peak usage of the communication network, via the communication network when at least one of the results exceeds a predetermined threshold value which reflects a certain amount of success in competing against the first player.

At the headend 200, the results may be compared with results of other players that are playing along, and may be employed to assist in further selections of interactive players which play in the first mode.

It is appreciated that various features of the invention which are, for clarity, described in the contexts of separate embodiments, may also be provided in combination in a single embodiment. Conversely, various features of the invention which are, for brevity, described in the context of a single embodiment, may also be provided separately or in any suitable sub-combination.

It will be appreciated by persons skilled in the art that the present invention is not limited by what has been particularly shown and described hereinabove. Rather the scope of the present invention is defined by the claims that follow.

What is claimed is:

1. For use with a system in which an interactive game is transmitted via a communication network to a multiplicity of viewer units, and in which each viewer unit includes an interface device and a television, and the interface device is coupled to the communication network, a gaming method for playing the interactive game at a player unit which is in two-way communication with a virtual reality kit activated by a player and including at least a two-way link with the player unit, and for viewing the game played by the player at the multiplicity of viewer units, the method comprising:

encoding, at a headend, a first version of the interactive game as a non-pay program by employing a first gaming program code and transmitting the first version of the interactive game to the multiplicity of viewer units;

encoding, at the headend, a second version of the interactive game by employing a second gaming program code and transmitting the second version of the interactive game to the player unit as a pay program which is received over a separate data stream;

transmitting, from the player unit, a payment authorization signal to the headend;

enabling the player to interactively play the interactive game, via the virtual reality kit, by performing actions in a virtual reality environment defined by the second version of the interactive game in response to said step of transmitting a payment authorization signal to the headend;

detecting the actions of the player and obtaining a stream of detection signals therefrom;

transmitting the detection signals to the headend via the communication network;

processing, at the headend, the detection signals to implement the actions of the player in an avatar which simulates the player; and electronically inserting the avatar in the first version of the interactive game which is transmitted to the multiplicity of viewer units.

2. A method according to claim 1 and wherein said step of processing comprises transforming the actions of the player to actions of the avatar in a virtual studio environment.

3. A method according to claim 1 and also comprising:

selecting a basic avatar from a group of avatars;

confirming a selection of the basic avatar by transmitting an authorization signal to the headend;

accepting the authorization signal at the headend; and combining a picture of the player with the basic avatar to create an avatar having combined characteristics of the player and of the basic avatar.

4. For use with a system in which an interactive game is transmitted via a communication network to a multiplicity of viewer units, and in which each viewer unit includes an interface device and a television, and the interface device is coupled to the communication network, a gaming method for playing the interactive game at a player unit, and for viewing the game played by the player at the multiplicity of viewer units, the method comprising:

encoding, at a headend, a first version of the interactive game as a non-pay program which includes a first environment by employing a first gaming program code, and transmitting the first version of the interactive game to the multiplicity of viewer units;

encoding, at the headend, a second version of the interactive game which includes a second environment by employing a second gaming program code;

transmitting the second version of the interactive game to the player unit as a pay program which is received over a separate data stream;

transmitting a payment authorization signal to the headend;

enabling the player to interactively play the interactive game in the second environment defined by the second version of the interactive game in response to said step of transmitting a payment authorization signal to the headend; and viewing, at the multiplicity of viewer units, the interactive game in the first environment defined by the first version of the interactive game.

5. A method according to claim 4 and wherein said first environment comprises an outer view environment of the game.

6. A method according to claim 4 and wherein said second environment comprises an inner view environment of the game.

7. A method according to claim 4 and wherein said first environment and said second environment comprise virtual studio environments.

8. A gaming method for use with an interactive game which is played via a communication network in a plurality of modes, the method comprising:

enabling a first player, playing at a first player unit, to interactively play the interactive game in a first mode by controlling an avatar via said communication network;

transmitting the interactive game played in the first mode to a plurality of viewer units;

in response to transmission of an authorization signal, enabling a second player, playing at one of the plurality of viewer units, to view the interactive game played in the first mode by the first player and to play along with the interactive game in a second mode by competing against the first player; and transmitting results of the interactive game played in the second mode via said communication network to a headend when at least one of said results exceeds a predetermined threshold value.

9. A method according to claim 8 and comprising the step of storing said results of the interactive game played in the second mode at said one of the plurality of viewer units.

10. A gaming system comprising:

a headend which is coupled to a communication network, the headend including:

an encoder for encoding a first version of the interactive game as a non-pay program by employing a first gaming program code to generate an encoded first version of the interactive game, and for encoding a second version of the interactive game by employing a second gaming program code to generate an encoded second version of the interactive game, wherein the second version of the interactive game is provided as a pay program which is received over a separate data stream;

a multiplexer for multiplexing the encoded first version of the interactive game and the encoded second version of the interactive game to produce a multiplexed signal; and a transmitter for transmitting the multiplexed signal to a plurality of viewers;

a multiplicity of viewer units, each including a television and an interface device which is coupled to the communication network and is operative to receive, demultiplex and decode the first version of the interactive game by employing the first gaming program code;

a player unit at which an interactive game is played by a player, the player unit including a player television, and a player interface device coupled to the player television, and to said communication network, wherein the player interface device is operative to transmit a payment authorization signal to the headend and to receive, demultiplex and decode the second version of the interactive game by employing the second gaming program code; and a player interface kit which includes at least a two-way link with the player unit, wherein the player interface kit is operative to detect actions performed by the player, to obtain a stream of detection signals therefrom, and to transmit the stream of detection signals to the headend via the player interface device and the communication network, and wherein in response to an acknowledgement of acceptance of the payment authorization signal at the headend, the detection signals are employed at the headend to implement the actions of the player in an avatar which simulates the player, the avatar being electronically inserted in the first version of the interactive game which is transmitted to said multiplicity of viewer units.

11. A gaming system comprising:

a headend which is coupled to a communication network, the headend including:

an encoder for encoding a first version of the interactive game as a non-pay program which includes a first environment by employing a first gaming program code to generate an encoded first version of the game, and for encoding a second version of the interactive game which includes a second environment by employing a second gaming program code to generate an encoded second version of the game, wherein the second version of the interactive game is provided as a pay program which is received over a separate data stream;

a multiplexer for multiplexing the encoded first version of the interactive game and the encoded second version of the interactive game to produce a multiplexed signal; and a transmitter for transmitting the multiplexed signal to a plurality of viewers;

a multiplicity of viewer units, each including a television and an interface device which is coupled to the communication network and is operative to receive, demultiplex and decode the first version of the interactive game by employing the first gaming program code, and to enable a viewer to view the interactive game in the first environment defined by the first version of the interactive game; and a player unit at which an interactive game is played by a player, the player unit including a player television, and a player interface device coupled to the player television, and to said communication network, wherein the player interface device is operative to transmit a payment authorization signal to the headend and to receive, demultiplex and decode the second version of the interactive game by employing the second gaming program code, and to enable the player to interactively play the interactive game in the second environment defined by the second version of the interactive game in response to an acknowledgement of acceptance of the payment authorization signal at the headend.

12. A system according to claim 11 and wherein said first version of the interactive game and said second version of the interactive game are transmitted on separate data streams.

13. A system according to claim 11 and wherein said first environment comprises an outer view environment of the game and said second environment comprises an inner view environment of the game.

14. A system according to claim 11 and wherein said first environment and said second environment are virtual studio environments.

15. A system according to claim 10 and wherein the player interface kit comprises a virtual reality kit.

16. A gaming method according to claim 8 and also comprising:

comparing said results with results of other players that are playing along so as to provide a comparison result; and determining a further selection of a first player for playing in the first mode based on the comparison result.

* * * * *